United States Patent
Laiho et al.

(10) Patent No.: US 8,582,726 B2
(45) Date of Patent: Nov. 12, 2013

(54) METHOD AND AN APPARATUS FOR HANDLING MULTIMEDIA CALLS

(75) Inventors: Keijo Tapio Laiho, Masala (FI); Ulrik Lind, Dubai (AE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 454 days.

(21) Appl. No.: 12/808,927

(22) PCT Filed: Dec. 20, 2007

(86) PCT No.: PCT/SE2007/051060
§ 371 (c)(1),
(2), (4) Date: Jun. 17, 2010

(87) PCT Pub. No.: WO2009/082301
PCT Pub. Date: Jul. 2, 2009

(65) Prior Publication Data
US 2011/0221858 A1  Sep. 15, 2011

(51) Int. Cl.
*H04M 11/00* (2006.01)

(52) U.S. Cl.
USPC .................. 379/88.13; 455/414.3; 348/14.02

(58) Field of Classification Search
USPC ........ 348/14.01, 14.02; 379/88.13; 455/414.1
See application file for complete search history.

(56) References Cited

U.S. PATENT DOCUMENTS

| 7,606,570 | B2 * | 10/2009 | Karaoguz et al. | 455/442 |
| 7,719,562 | B2 * | 5/2010 | Liu | 348/14.01 |
| 2003/0096627 | A1 | 5/2003 | Rasanen et al. | |
| 2004/0180689 | A1 * | 9/2004 | Nayak | 455/552.1 |
| 2007/0268359 | A1 * | 11/2007 | Zhang et al. | 348/14.01 |

FOREIGN PATENT DOCUMENTS

| EP | 1 724 981 A1 | 11/2006 |
| EP | 1 858 267 A1 | 11/2007 |
| EP | 1 868 348 A2 | 12/2007 |
| JP | A 2005-252668 | 9/2005 |
| WO | WO 2006/136959 A1 | 12/2006 |
| WO | WO 2007/109805 | 9/2007 |

* cited by examiner

Primary Examiner — Olisa Anwah

(57) ABSTRACT

The present invention relates to a system and method for setting up communication between a first and a second user equipment in a mobile radio communications system, wherein said first user equipment is attempting a multimedia call to said second user equipment. The method is characterized by the steps of: receiving a multimedia call request in a video gateway relating to said multimedia call; sending a voice call request from said video gateway towards said second user equipment in order to set up a voice connection between the video gateway and said second user equipment; setting up a multimedia connection between the video gateway and said first user equipment; and forwarding audio, received over said multimedia connection, onto said voice connection and forwarding audio, received over said voice connection, onto said multimedia connection.

16 Claims, 9 Drawing Sheets

FIG. 1 - PRIOR ART

METHOD AND AN APPARATUS FOR HANDLING MULTIMEDIA CALLS

TECHNICAL FIELD

The present invention relates in general to handling multimedia calls in a mobile radio communication system, and in particular to a method and an apparatus for handling multimedia calls to users without video capabilities.

BACKGROUND

Many existing mobile radio communications systems are compatible with the 3GPP standard, which is an international standardized specification provided by the 3rd Generation Partnership Project (3GPP). The 3GPP standard is based on the evolution of the second generation (2G) mobile radio communications system known as the Global System for Mobile Communications (GSM), and aims to provide a specification of a globally applicable third generation (3G) mobile radio communication system.

From the 3GPP standard Release 99 and onwards functionalities are included that enable a user of a 3G user equipment to make a multimedia call, comprising both audio and video, to a user of another 3G user equipment.

In order to get a multimedia call established between two 3G user equipments, it is required that both of the 3G user equipments are multimedia capable and within coverage of a 3G mobile radio communication system. However, if a user of a 3G user equipment attempts to make a multimedia call to another user which, for example, does not have a 3G user equipment, or is not within coverage of a 3G mobile radio communication system, the mobile communication network node, that is, the mobile services switching centre (MSC), will release the call. The user attempting the multimedia call will then be prompted to give an indication on how to proceed, for example, whether to establish an ordinary voice call instead.

While this enables users to readily choose a voice call instead, prompting the choice of a voice call instead of a multimedia call is often perceived as negative and awkward by the user and will decrease the user's willingness to attempt multimedia calls in the future. This since the user may consider it unnecessary to attempt a multimedia call in the first place, since in practice he can achieve the same result, that is, the ordinary voice call, easier and faster by establishing the voice call to begin with.

Particularly, this may occur in situations where the probability of successfully establishing a multimedia call is not very high, such as, for example, in areas where the 3G mobile radio communications system coverage is not as good as the coverage of the 2G mobile radio communications system, or in areas where most users don't yet have 3G user equipments.

This leads to end users not utilizing the full features of their 3G user equipments, and the multimedia services and opportunities provided thereto. Also, since the end users then will be unfamiliar with how to use the multimedia services provided by the mobile network operators, it will be difficult for them to use new emerging multimedia services for 3G user equipments as they are introduced by the mobile network operators.

SUMMARY

A problem to which the present invention relates is how to increase the ease of use of multimedia calls and services for users having 3G user equipments in 2G and 3G mobile radio communication systems.

This problem is solved by a method for setting up communication between a first and a second user equipment in a mobile radio communications system, wherein said first user equipment is attempting a multimedia call to said second user equipment. The method is characterized by the steps of: receiving a multimedia call request in a video gateway relating to said multimedia call; sending a voice call request from said video gateway towards said second user equipment in order to set up a voice connection between the video gateway and said second user equipment; setting up a multimedia connection between the video gateway and said first user equipment; and forwarding audio, received over said multimedia connection, onto said voice connection and forwarding audio, received over said voice connection, onto said multimedia connection.

The users of 3G user equipments are provided with a more easy-to-use multimedia call service that is capable of handling a multimedia call, so as to provide a voice communication with a user equipment that can not establish a multimedia call. This is performed without disconnecting the multimedia call and prompting the user to establish a normal voice call instead. Therefore, the negative effects of having users of a 3G user equipment actively select a voice call instead of the multimedia call, when a multimedia call to another user equipment is not possible to establish, will also be eliminated.

This will also lead to an increased availability of the multimedia services provided to users of 3G user equipments, and also allow said users to more easily and fully utilize the features of the 3G user equipment and the advantages of the multimedia services connected thereto.

The object of the present invention is further achieved by having a video gateway negotiating with the first user equipment a second media format to be used for video transmission over the multimedia connection; having the video gateway performing signalling with at least one content streaming server in order to achieve the transmitting of data content from said at least one content streaming server to said video gateway; receiving data content from said at least one content streaming server; and transmitting data content from said at least one content streaming server over the multimedia connection, applying the negotiated second media format, to said first user equipment.

The object of the present invention is further achieved by sending an invite message from said video gateway to an IMS core network inviting the IMS core network to supply data content for the multimedia call between the video gateway and the first user equipment.

A further advantage of the invention described above is that additional multimedia services may be provided, during the duration of the multimedia call, to the user of the 3G user equipment.

The object of the present invention is also achieved by a method for handling the release of a multimedia call in a mobile radio communications system, the method comprising the step of: receiving, in a mobile services switching centre, a message indicating a release of a multimedia call originating from a user equipment; said method is further characterized by the step of: sending, upon receiving said message indicating the release, from the mobile services switching centre to a video gateway in said mobile radio communications system, a multimedia call request relating to said user equipment.

The object of the present invention is also achieved by a video gateway for use in a mobile radio communications system, wherein a first user equipment is attempting a multimedia call to a second user equipment, characterized in that the video gateway is arranged to: receive a multimedia call request relating to said multimedia call, send a voice call request in order to set up a voice connection to the second user equipment, set up a multimedia connection to the first user equipment, and forward audio, received over said multimedia connection, onto said voice connection and forward audio, received over said voice connection, onto said multimedia connection.

The object of the present invention is also achieved by a mobile services switching centre for use in a mobile radio communications system characterized in being arranged to: upon receiving a message indicating a release of a multimedia call originating from a user equipment, send a multimedia call request relating to said user equipment to a video gateway in said mobile radio communications system.

The object of the present invention is also achieved by a computer program product for use in a video gateway, which comprises computer readable code means, which when run in the video gateway causes said video gateway to perform the steps of: receiving a multimedia call request in said video gateway relating to said multimedia call; sending a voice call request from said video gateway towards said second user equipment in order to set up a voice connection between the video gateway and said second user equipment; setting up a multimedia connection between said video gateway and said first user equipment; and forwarding audio, received over said multimedia connection, onto said voice connection and forwarding audio, received over said voice connection, onto said multimedia connection.

Another advantage of the present invention is that it provides users with the advantage of being familiar with the use of multimedia services.

Further advantageous embodiments of the methods, the video gateway, the mobile soft switch solution and the computer program product are set forth in the dependent claims, which correspondently describe further advantageous embodiments of the present invention.

BRIEF DESCRIPTION OF THE DRAWINGS

The present invention will be described in more detail in the following with reference to the appended drawings, in which.

DETAILED DESCRIPTION

Figure 1:
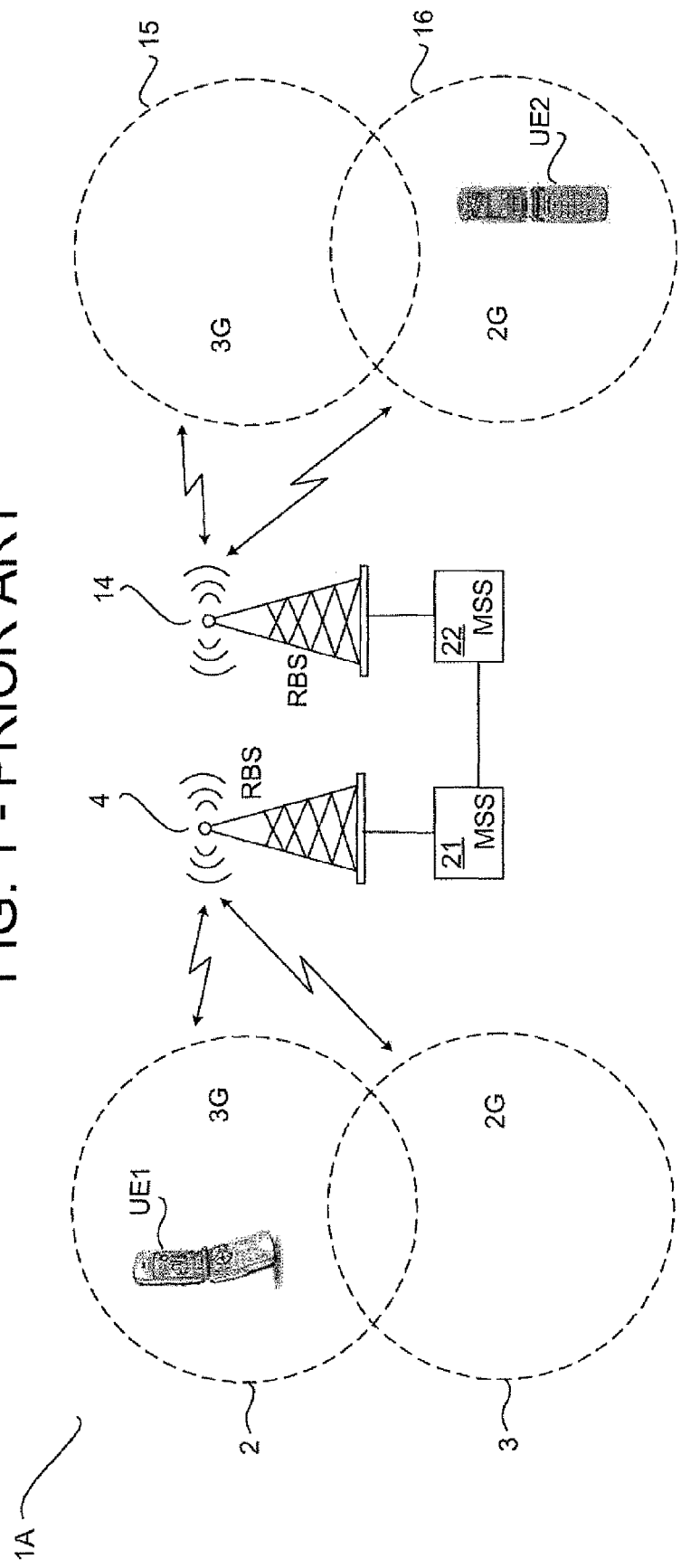
FIG. 1 illustrates a mobile radio communications system according to the prior art.

FIG. 1 shows an overview of a mobile radio communications system 1A according to prior art. FIG. 1 also presents an exemplary situation wherein a 3G user equipment UE1 is located in a 3G coverage area 2 associated with a mobile soft switch solution (MSS) 21 and a user equipment UE2 is located in the 2G coverage area 16 associated with a mobile soft switch solution (MSS) 22. This exemplary situation helps to illustrate the problems in mobile radio communication systems according to prior art.

For example, according to the exemplary situation in FIG. 1, if a user of the 3G user equipment UE1 attempts to make a multimedia call to a user of the user equipment UE2, the MSS 22 will release the call. The MSS 22 will release the multimedia call either because it recognizes that the user of the user equipment UE2 is only located within the 2G coverage area 16, or because it recognizes that the user equipment UE2 is not a 3G user equipment. The MSS 22 will release the multimedia call by sending a release message to the MSS 21. According to the prior art, the MSS 21 will receive the release message from the MSS 22 and release the multimedia call, whereby the 3G user equipment UE1 will prompt its user to indicate whether the user wishes to establish an ordinary voice call to the user equipment UE2 instead. For reasons explained in the above, this results in a decreased use of multimedia services by user of 3G user equipments, and therefore does not allow the users to fully utilize the features of their 3G user equipments and getting the chance to enjoy the advantages of multimedia services.

According to the inventive features of the present invention, these problems may be solved by a mobile radio communications system comprising a video gateway and a mobile soft switch solution of which exemplary embodiments are presented in the following. The video gateway may with the help of the mobile soft switch solution set up a multimedia connection to a first user equipment and a voice connection to a second user equipment, and then selectively interconnect the voice connection of the second user equipment and the multimedia connection of the first user equipment with each other, whereby the unused resources of the multimedia connection may be used by the video gateway to provide various multimedia streaming services.

Figure 2:
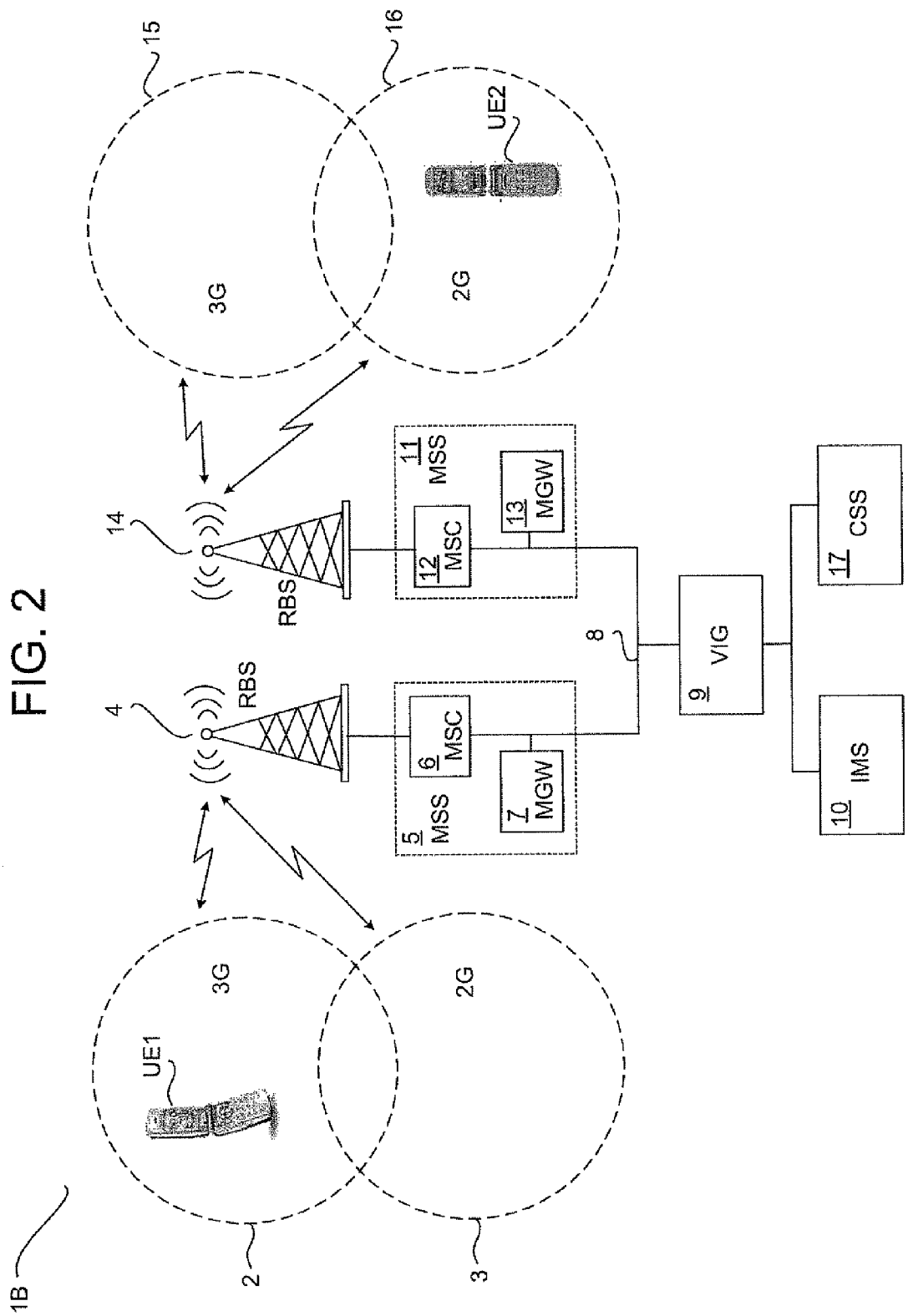
FIG. 2 illustrates a mobile radio communications system according to the present invention.

FIG. 2 illustrates a mobile radio communications system 1B according to the present invention. FIG. 2 also shows an illustrative example of a situation in which the features of the present invention are fittingly described.

A 3G user equipment UE1 is located within a 3G coverage area 2 provided by a radio base station (RBS) 4. The RBS 4 may be arranged to provide both 3G and 2G coverage for user equipments within a designated geographical service area or cell. Alternatively, one RBS may be arranged to provide the 3G coverage and another RBS may be arranged to provide the 2G coverage within the designated geographical service area or cell. Thus, along with the 2G coverage area 3, the 3G coverage area 2 comprises the geographical service area or cell of the RBS 4. The 3G coverage area 2 and the 2G coverage area 3 may cover separate areas, cover partially overlapping areas or cover areas that completely overlap each other. The 3G coverage area 2 and the 2G coverage area 3 may also be of different sizes and shapes depending on, for example, the capabilities of the RBS 4 or the surrounding environment.

Generally, in a mobile radio communication system, a large number of radio base stations (RBSs), such as the RBS 4, are often connected to a radio network controller (RNC). In turn, several of these radio network controllers (RNCs) may be connected to a mobile services switching centre (MSC). Other nodes may also be included in the mobile radio communications system 1B.

The mobile services switching centre (MSC) 6 may be a part of a mobile soft switch solution (MSS) 5. The MSS 5 may also include a media gateway (MGW) 7. The MGW 7 can be controlled and used by the MSC 6 when signalling other network nodes within the mobile radio communications system 1B. The MGW 7 may be used as an intermediate node for connecting the MSC 6 in the MSS 5 with the VIG 9. The MSS 5, the RBS 4 and the 3G user equipment UE1 is in the following referred to as the originating side, particularly in connection with FIGS. 4, 6 and 8.

The 3GPP standard Release 99 and onwards, with which the MSS 5 may be compatible, enables the establishment of multimedia calls, comprising both audio and video, between 3G user equipments that are both located within 3G coverage areas. The MSS 5 may establish multimedia calls by using, for example, the 3G-324M multimedia protocol architecture (3G-324M), which is a multimedia protocol suite specified by the technical specification "Codec for Circuit Switched Multimedia Telephony Service", 3GPP TS 26.111. The 3G-324M enables the MSS 5 to establish, for example, a 64 kbit/s unrestricted digital connection between 3G user equipments through 3G circuit switched networks connecting different mobile soft switch solutions. For example, the MSS 5 may be arranged to establish, using 3G-324M, a 64 kbit/s unrestricted digital connection between the 3G user equipment UE1 located within the 3G coverage area 2 associated with the MSC 6 and any 3G user equipment that is located, for example, within the 3G coverage area 14 associated with the MSC 12 in the MSS 11. The digital connection provided by 3G-324M allows the MSS 5 and MSS 11 to provide channels for multimedia including audio and video between 3G user equipments using H.223 multiplexing.

The 3GPP standard Release 6 and onwards, with which the MSS 5 also may be compatible, provides further functionalities. The 3GPP standard Release 7 further provides additional interaction or interworking functionality between 3G user equipments using 3G-324M, i.e. mobile terminals, and other user equipments using an IP Multimedia Subsystem (IMS).

A user equipment capable of accessing the IMS may be any user equipment with network access capabilities to the IMS core network 10, for example, a laptop or a computer provided with internet access capabilities. The interaction or interworking between the different user equipments may be performed by an intermediate node/interworking point. In FIG. 2, this intermediate node/interworking point is a video gateway (VIG) 9. A VIG 9 is generally used as the intermediate node/interworking point between 3G-324M and IP based multimedia architectures. The VIG 9 may be arranged to, for example, use the packet based multimedia transport protocol H.323, the session initiation protocol (SIP) or the real time streaming protocol (RTSP). In short, the VIG 9 may be responsible for routing calls into an IP domain from a circuit switched (CS) domain or into the CS domain from the IP domain. The CS domain may, for example, comprise all of the circuit switched nodes from the network 8 providing circuit switched services to the mobile soft switch solutions MSS 5, 11 and the RBSs 4, 14. Although, shown in FIG. 2 as being connected to the mobile soft switch solutions MSS 5, 11, it is to be understood that the VIG 9 may be arranged to provide services for multiple MSSs at any given time. The VIG 9 will be described in more detail in relation to FIGS. 3-8.

In FIG. 2, the VIG 9 is also connected to and arranged to communicate with a content streaming server(s) (CSS) 17. The VIG 9 may be arranged to receive multimedia and video content comprised in the CSS 17. Also in FIG. 2, the VIG 9 is connected to and arranged to communicate with an IP Multimedia Subsystem (IMS) 10. The IMS core network 10 is an open, standardised, multi-media architecture for mobile and fixed IP services. The IMS core network 10 is used by telecom operators, for example, to combine voice and data in a single packet switched network in order to offer network controlled multimedia services.

The mobile radio communications network 8 providing circuit switched services interconnects, as shown in FIG. 2, the mobile soft switch solution MSS 5 and the mobile soft switch solution MSS 11, wherein the MSS 5 and the MSS 11 may be any two mobile soft switch solutions within the mobile radio communications system 1B.

The MSS 11 may comprise the same nodes or entities and provide the same types of functionalities as the MSS 5. That is, the MSS 11 may comprise an MSC 12 connected to a MGW 13, which the MSS 11 may use when signalling other network nodes within the mobile radio communications system 1B and/or the VIG 9. The MSC 12 may also be connected to an RBS 14, which may provide 3G and 2G coverage as is illustrated by the 3G coverage area 15 and the 2G coverage area 16. A user equipment UE2, which may be or may not be a 3G user equipment, is currently located in the 2G coverage area 16. The MSS 11, the RBS 14 and the user equipment UE2 will in the following be referred to as the terminating side, particularly in connection with FIGS. 4, 6 and 8.

Figure 3:
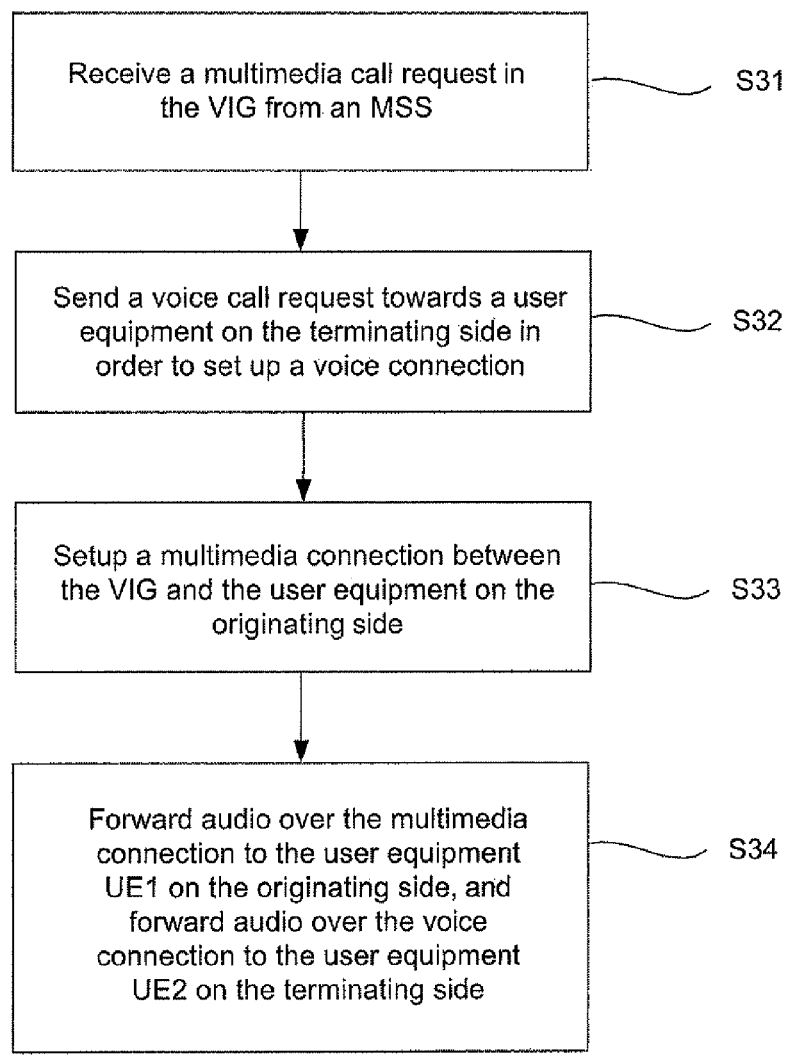
FIG. 3 shows an exemplary operation of a video gateway according to an embodiment of the present invention.

FIG. 3 shows an exemplary operation of a video gateway according to an embodiment of the present invention. In particular, FIG. 3 shows an exemplary operation of a video gateway (VIG) 9 for setting up a communication between the user equipment UE1 and the user equipment UE2 in a mobile radio communications system 1B. As the user equipment UE1 in the exemplary situation presented in FIG. 2 attempts a multimedia call to the user equipment UE2, the MSS 11, currently associated with the user equipment UE2, will respond by releasing the multimedia call. As it releases the multimedia call, the MSS 11 may send a release message to the MSS 5 currently associated with the user equipment UE1. According to the present invention and also described in more detail in reference to FIGS. 9 and 10, the MSS 5 may, in response to receiving the release message, route the multimedia call request to the VIG 9.

In step S31, the multimedia call request relating to the multimedia call is received in the VIG 9 from the MSS 5.

In step S32, the VIG 9 performs a fall-back-to-voice, that is, sends a voice call request in order to set up a voice connection between the VIG 9 and the user equipment UE2 on the terminating side of the mobile radio communications system 1B.

In step S33, the VIG 9 sets up a multimedia connection between the VIG 9 and the user equipment UE1 on the originating side of the mobile radio communications system 1B.

In step S34, the VIG 9 forwards audio over the multimedia connection to the user equipment UE1 on the originating side of the mobile radio communications system 1B, as well as, forwards audio over the voice connection to the user equipment UE2 on the terminating side of the mobile radio communications system 1B.

The exemplary operation of the VIG 9 described above will eliminate the negative effects of having users of a 3G user equipment actively selecting the voice connection instead of the multimedia connection, when a multimedia connection to another user equipment is not possible to establish. Thus, the present invention will lead to an increased availability of the multimedia services provided to users of 3G user equipments, and also allow said users to more easily and fully utilize the features of the 3G user equipments and enjoy the current and future advantages of multimedia services.

Figure 4:
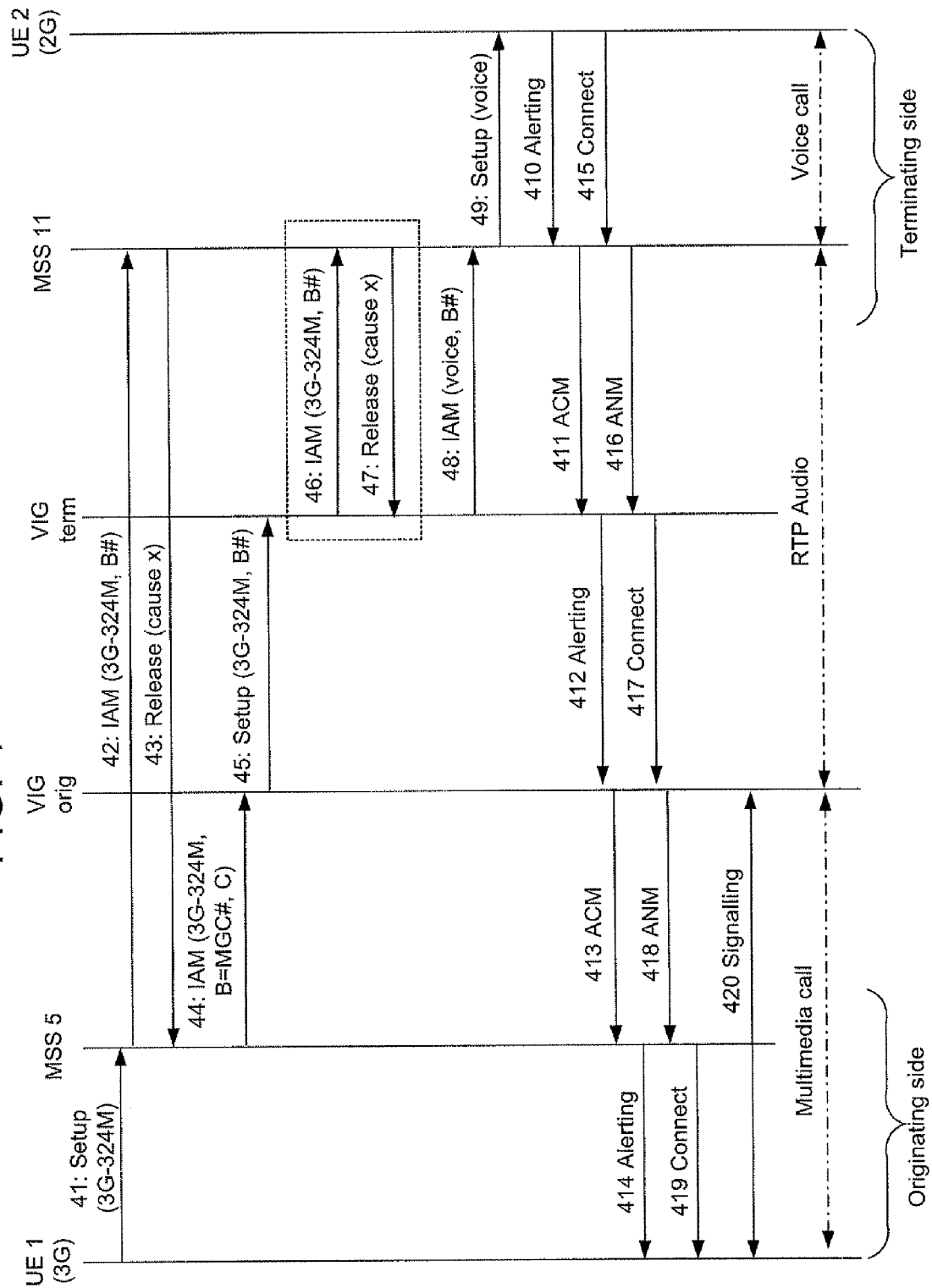
FIG. 4 shows a signalling diagram describing an exemplary operation of a video gateway according to an embodiment of the present invention.

FIG. 4 shows a signalling diagram according to an exemplary embodiment of the present invention. In particular, it shows a signalling diagram describing in more detail how the exemplary operation according to the previously described embodiment, in accordance with FIG. 3, may be performed.

In FIG. 4, the user equipment UE1, which in FIG. 2 is located within the 3G-coverage area 2 associated to the MSS 5, sends a 3G-324M setup message 41 to the MSS 5. As indicated in FIG. 2, the user equipment UE1 and the MSS 5 may be said to be comprised in and referred to as the originating side of the mobile radio communications system 1B. The MSS 5 then sends a 3G-324M Initial Address Message (IAM) 42 to the MSS 11 with which the user equipment UE2 is currently associated. It should be noted that the MSS 5 and the MSS 11 may be the same node. If the MSS 11 detects that a multimedia call can not be established to user equipment UE2, for example, when the user equipment UE2 is not within 3G coverage or the user equipment UE2 is not a 3G user equipment, the MSS 11 will release the multimedia call and send a release message 43 to the MSS 5, according to the correct standard. The release message 43 may also include a specific cause code x indicating the reason for the release.

Figure 10:
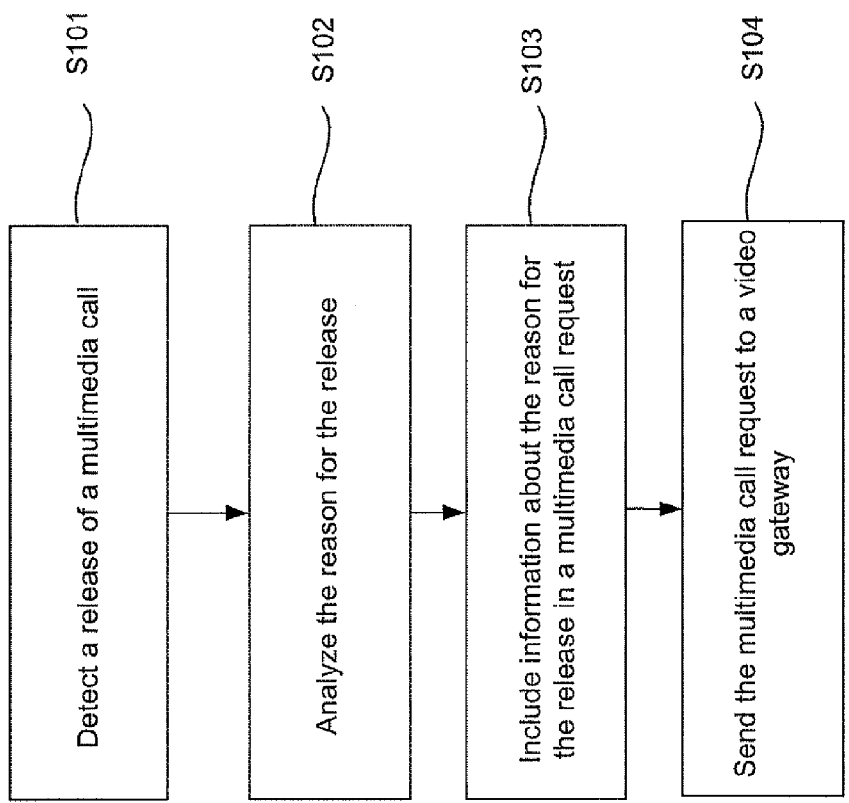
FIG. 10 shows another exemplary operation of a mobile services switching centre according to an embodiment of the present invention.
Figure 9:
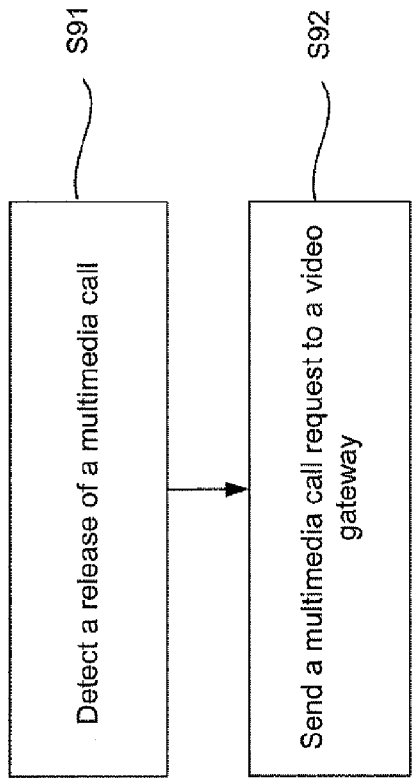
FIG. 9 shows an exemplary operation of a mobile services switching centre according to an embodiment of the present invention.

Upon receiving the release message 43, possibly including the specific cause code x, from the MSS 11, the MSS 5 may, according to the present invention and also described in more detail in reference to FIGS. 9 and 10, detect the reason for the release and forward a 3G-324M IAM message 44. For the purpose of illustration, the VIG 9 can be seen as comprising an originating side, $VIG_{orig}$, and a terminating side, $VIG_{term}$. The 3G-324M IAM message 44 is forwarded to and received by the originating side of the VIG 9, that is, the $VIG_{orig}$. The MGC 54 is further described in reference to FIG. 5. As the $VIG_{orig}$ receives the 3G-324M IAM message 44, it sends a 3G-324M setup message 45 to the terminating side of the VIG 9, $VIG_{term}$.

As marked within the dotted area in FIG. 4, the $VIG_{term}$ may upon receiving the 3G-324M setup message 45 in turn forward a 3G-324M IAM message 46 to the MSS 11. The MSS 11 may send a release message 47 to the $VIG_{term}$, if a multimedia call still can not be established to the user equipment UE2. Should the user equipment UE2 now be capable of receiving the multimedia call, the MSS 11 may alternatively set up the multimedia call to the user equipment UE2. The sending of the messages 46 and 47 is not necessary, but may be performed in order to ensure the status of the user equipment UE2. The user equipment UE2 may have passed into a 3G-coverage area 15 or there may have been some other changes in the mobile radio communications system 1B that may now allow a multimedia call to be set up with the user equipment UE2. The release message 47 may also include a specific cause code x indicating the reason for the release.

On the other hand, the MSS 5 may in the 3G-324M IAM message 44 also include the reason for the release received in the release message 43. The reason for the release may then be forwarded in the 3G-324M setup message 45 to the $VIG_{term}$ in the VIG 9.

As the $VIG_{term}$ of the VIG 9 receives the release message 47 from the MSS 11, or directly as it receives the 3G-324M setup message 45 from the $VIG_{orig}$ should the reason for the release be included therein, the $VIG_{term}$, may send an IAM message 48 to the MSS 11 requesting a voice call to user equipment UE2. This may be referred to as a "fall-back-to-voice"-message. This is performed in order to establish a voice connection between the $VIG_{orig}$ and the user equipment UE2 associated with the MSS 11 over the $VIG_{term}$.

As the MSS 11 receives the IAM message 48 requesting a voice call to user equipment UE2 from the $VIG_{term}$, the MSS 11 will send a voice setup message 49 to the user equipment UE2 in order to set up the voice connection between the $VIG_{orig}$ and the user equipment UE2 over the $VIG_{term}$. The voice setup message 49 may then be answered to by the user equipment UE2 through the nodes of the mobile radio communications system 1B. The alerting and address complete (ACM) messages 410-414 will let the intermediate nodes (MSS 11, $VIG_{term}$, $VIG_{orig}$, MSS 5) and the user equipment UE1 know that the user of the user equipment UE2 is being alerted. The connect and answer (ANM) messages 415-419 will let the intermediate nodes (MSS 11, $VIG_{term}$, $VIG_{orig}$, MSS 5) and the user equipment UE1 now that the user of the user equipment UE2 has answered. The signalling 410-419 will establish a voice connection between the user equipment UE2 and the $VIG_{orig}$ over the $VIG_{term}$, as well as, allow signalling 420 for setting up a multimedia connection between the user equipment UE1 and the $VIG_{orig}$ in the VIG 9.

In order to set up a multimedia connection between the user equipment UE1 and the $VIG_{orig}$ that allows interconnect with the $VIG_{term}$ through the voice connection, the $VIG_{orig}$ performs signalling 420 with the user equipment UE1 to set up the multimedia connection. The signalling 420 may be media negotiation signalling and is performed in order to, for example, negotiate a suitable media format and open up a logical channel for audio in the multimedia connection. The signalling 420 may, for example, be performed using the H.245 protocol. The $VIG_{orig}$ then de-multiplexes the incoming signal of the multimedia connection, and forwards audio from/to the multimedia connection with the user equipment UE1 to/from the voice connection to the user equipment UE2 over the $VIG_{term}$.

As a result of the signalling described above, an audio communication is established between the user equipment UE1 on the originating side and the user equipment UE2 on the terminating side, over the $VIG_{orig}$ and $VIG_{term}$. The multimedia connection between the user equipment UE1 and the $VIG_{orig}$ may be an 64 kbit/s unrestricted digital connection, which may use the multiplex protocol, H.223. The voice connection from the $VIG_{orig}$ to the MSS 11 over the $VIG_{term}$, may be performed using, for example, RTP (Real Time Protocol). The voice connection between the MSS 11 and user equipment UE2 may be performed using a standard 2G TDM (Time Division Multiplexing) connection.

If a suitable signalling protocol is used between the MSS 5, the VIG 9 and the MSS 11, it would allow transcoder free signalling or a tandem free operation mode from end to end. This makes it possible to achieve the use of a common audio codec between the user equipment UE1 and the user equipment UE2. The use of a common codec would eliminate any need of transcoders in mobile radio communications system 1B, which usually have a negative impact on the quality of the voice communication. An example of such a suitable signalling protocol is BICC, Bearer Independent Call Control.

Figure 5:
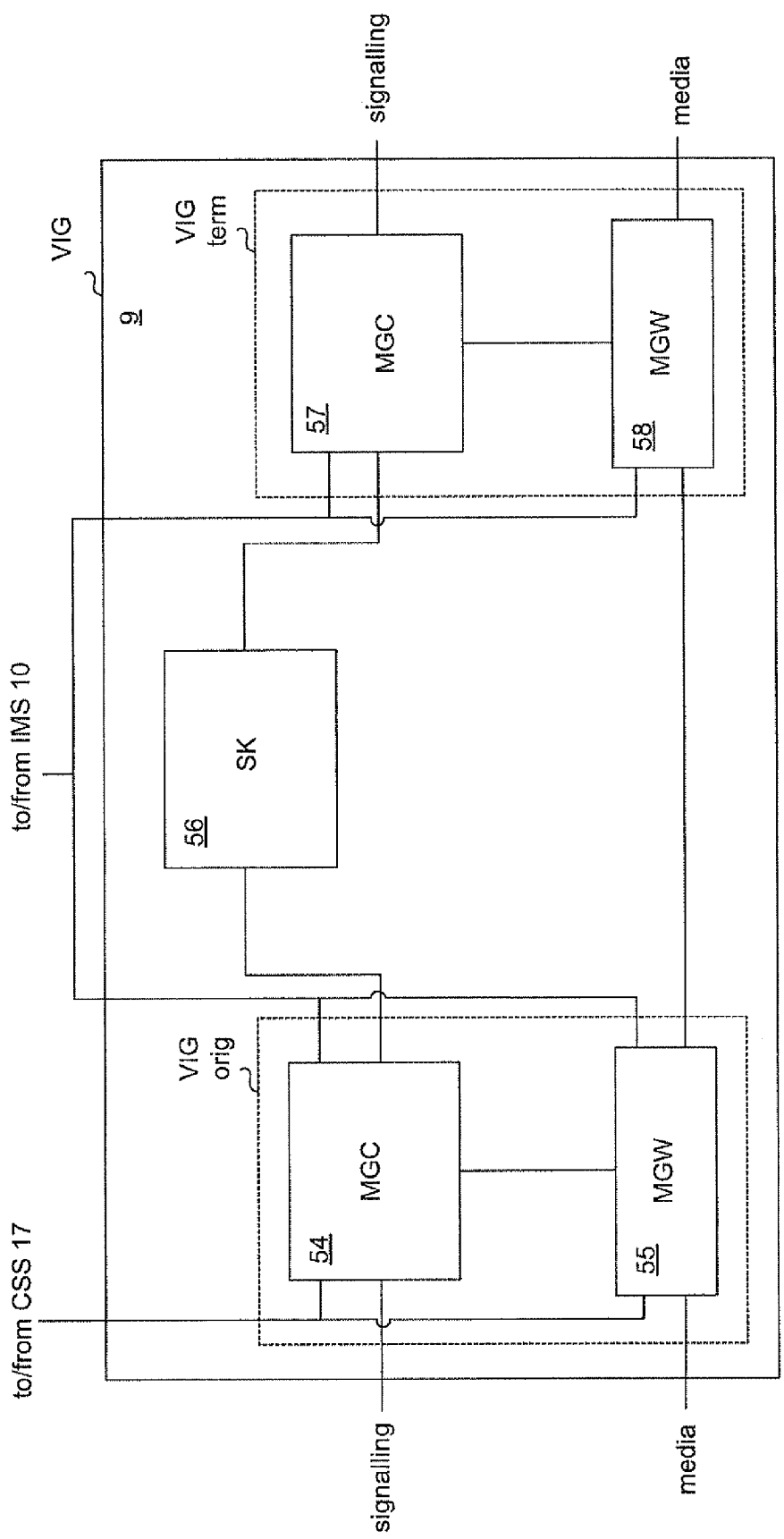
FIG. 5 illustrates a video gateway according to an embodiment of the present invention.

FIG. 5 illustrates a video gateway (VIG) 9 according to an embodiment of the present invention. The VIG 9 in FIG. 5 comprises a $VIG_{orig}$ on the originating side of the VIG 9 and a $VIG_{term}$, on the terminating side of the VIG 9. A site keeper (SK) 56 is located in a control plane path between the $VIG_{orig}$ and the VIG$_{term}$. The SK 56 may perform input/output routing for the VIG$_{orig}$ and the VIG$_{term}$ in the VIG 9.

The VIG$_{orig}$ on the originating side of the VIG 9 may comprise a media gateway controller (MGC) 54 and a media gateway (MGW) 55. The VIG$_{term}$, on the terminating side of the VIG 9 may comprise a media gateway controller (MGC) 57 and a media gateway (MGW) 58. It should be noted that the operations of the VIG$_{orig}$ and the VIG$_{term}$ may be performed by the same MGC and MGW in the VIG 9. It should also be noted that although only two MGWs are shown in FIG. 3, it is to be understood that the VIG 9 may comprise any number of MGWs, including only one MGW.

In FIG. 5, the MGWs 55 and 58 in the VIG$_{orig}$ and the VIG$_{term}$, act as translation units for media communication signals between circuit-switched network nodes in the mobile communication system 1B, such as, for example, the MSS 5 and the MSS 11, and packet-switched networks, such as, for example, the IMS core network 10. That is, the MGWs 55 and 58 may convert media communication signals from circuit switched protocols into packet switched protocols, and vice versa. The various networks may be, for example, $2^{nd}$ generations of mobile radio communication networks, transit networks such as the Internet, Intranets, local area networks (LANs) and ATM based transit networks, and fixed telephone networks such as public switched telephone networks (PSTNs) and ISDNs, over various transport networks. The MGW 55 and MGW 58 in the VIG$_{orig}$ and the VIG$_{term}$ are controlled by the media gateway controllers, MGC 54 and MGC 57, respectively. The MGCs 54 and 57 may also be referred to as Call Agent or Call Controllers. The MGC 54 and 57 may be devices, nodes and/or logical entities within the VIG 9.

The MGC 54 may receive signalling directly from the MSS 5 and 11 and provide the MGW 55 with instructions in order to handle, for example, call routing, control of connections, and control of network resources etc. Furthermore, the MGC 54 may instructs the MGW 55 to perform tasks such as alerting, sending and receiving media signals to/from connected parties in various networks. For the communication between the MGC 54 and the MGW 55 a number of different protocols may be used, for example, SGCP, IPDC, MGCP and H.248. The MGC 54 may also interact with network nodes in the mobile radio communications system 1B outside of the VIG 9 such as, for example, the content streaming server (CSS) 17. For the external interact the MGC 54 may use other signalling protocols, for example, SS7, H.323, RTSP and SIP.

According to this embodiment of the present invention, a call established through the VIG 9, for example, according to the embodiments shown in FIGS. 3 and 4, is in the VIG 9 treated as two "half" calls. One "half" call or call leg is established between the originating side of the mobile radio communications system 1B and the MGC 54 in the VIG$_{orig}$, i.e. the multimedia call, and the other "half" call or call leg between the MGC 54 in the VIG$_{orig}$, over the MGC 57 in the VIG$_{term}$, and the terminating side of the mobile radio communications system 1B, i.e. the voice call.

The MGC 54 in FIG. 5 may receive multimedia call requests, such as, the 3G-324M setup message in FIG. 4, and control the media gateway, MGW 55, in order to handle the multimedia call requests. The MGC 54 may prepare to demultiplex a multimedia connection and send a multimedia setup message to the MGC 57. The MGCs 54 and 57 may, for example, use the H.323 protocol, or SIP protocol, in their communication through the SK 56.

The different entities described above represent different logical entities that may be implemented at different locations in the mobile radio communications system 1B depending on, for example, the functional and geographical needs and products that implements the functions. For example, the MGCs 54 and 57 and the corresponding entities connected thereto (e.g. MGWs 55 and 58, and SK 56), may be co-located in the same node as shown in FIG. 5 or located in different physical nodes. The same applies in FIG. 2 to the MGWs 7, 13 supporting the functionality of the MSCs 6, 12 in the MSSs 5, 11, which may be co-located with the MGWs 55 and 58 in FIG. 5 supporting the functionalities of the VIG 9. Furthermore, the MSCs 6, 12 in the MSSs 5, 11 may also be co-located with the MGCs 54 and 57, respectively.

According to the embodiments of the present invention shown above, an audio or voice communication between the user equipment UE1 and the user equipment UE2 may be obtained. One "half" of the call, i.e. the voice call between the VIG$_{orig}$ and the user equipment UE2 over the VIG$_{term}$, on the terminating side of the mobile radio communications system 1B, is established over a speech bearer, but the other "half" of the call, i.e. the multimedia call between the VIG$_{orig}$ in the VIG 9 and the user equipment UE1 on the originating side of the mobile radio communications system 1B, is established over a multimedia bearer, such as e.g. a 64 kbit/s unrestricted digital bearer. It follows that the multimedia bearer is not fully utilized, since only normal audio communication is transmitted over the multimedia bearer.

Figure 6:
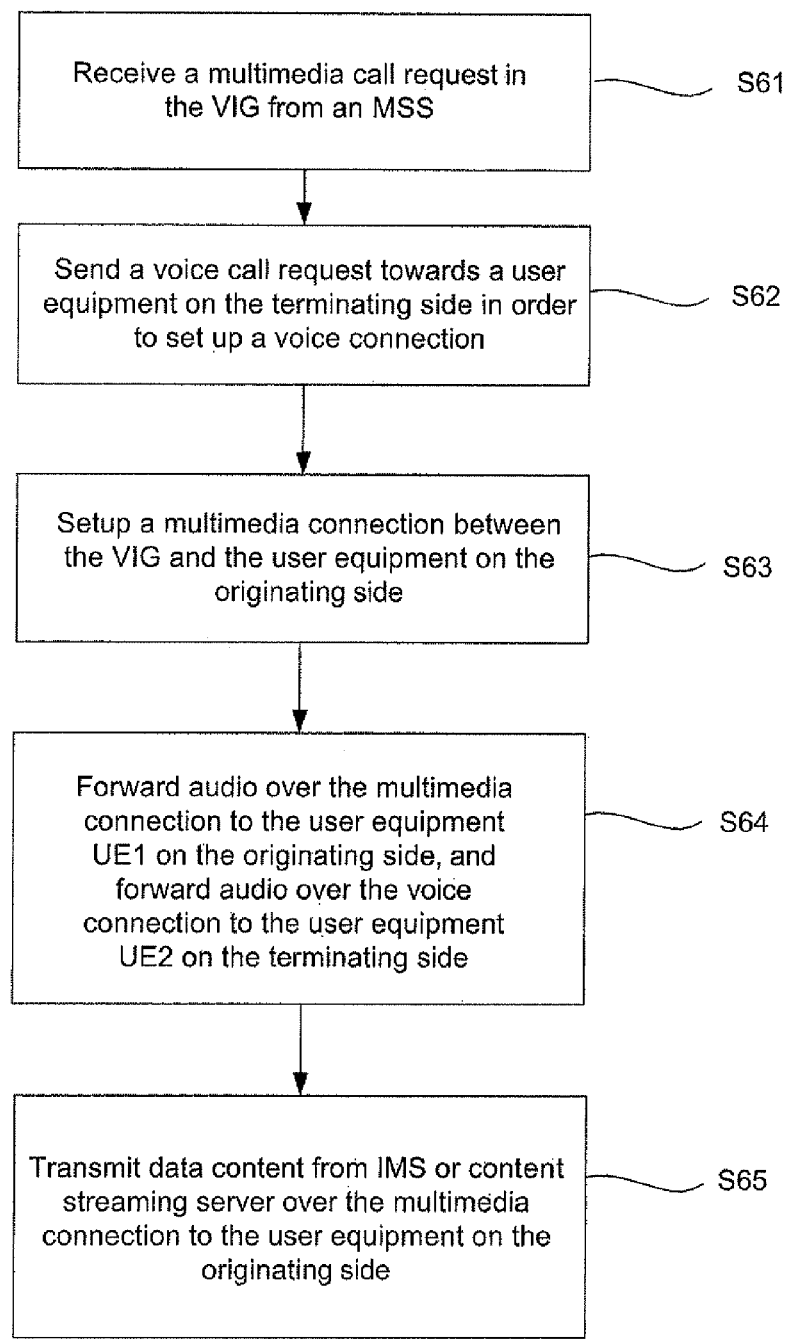
FIG. 6 shows another signalling diagram describing an exemplary operation of a video gateway according to an embodiment of the present invention.
Figure 7:
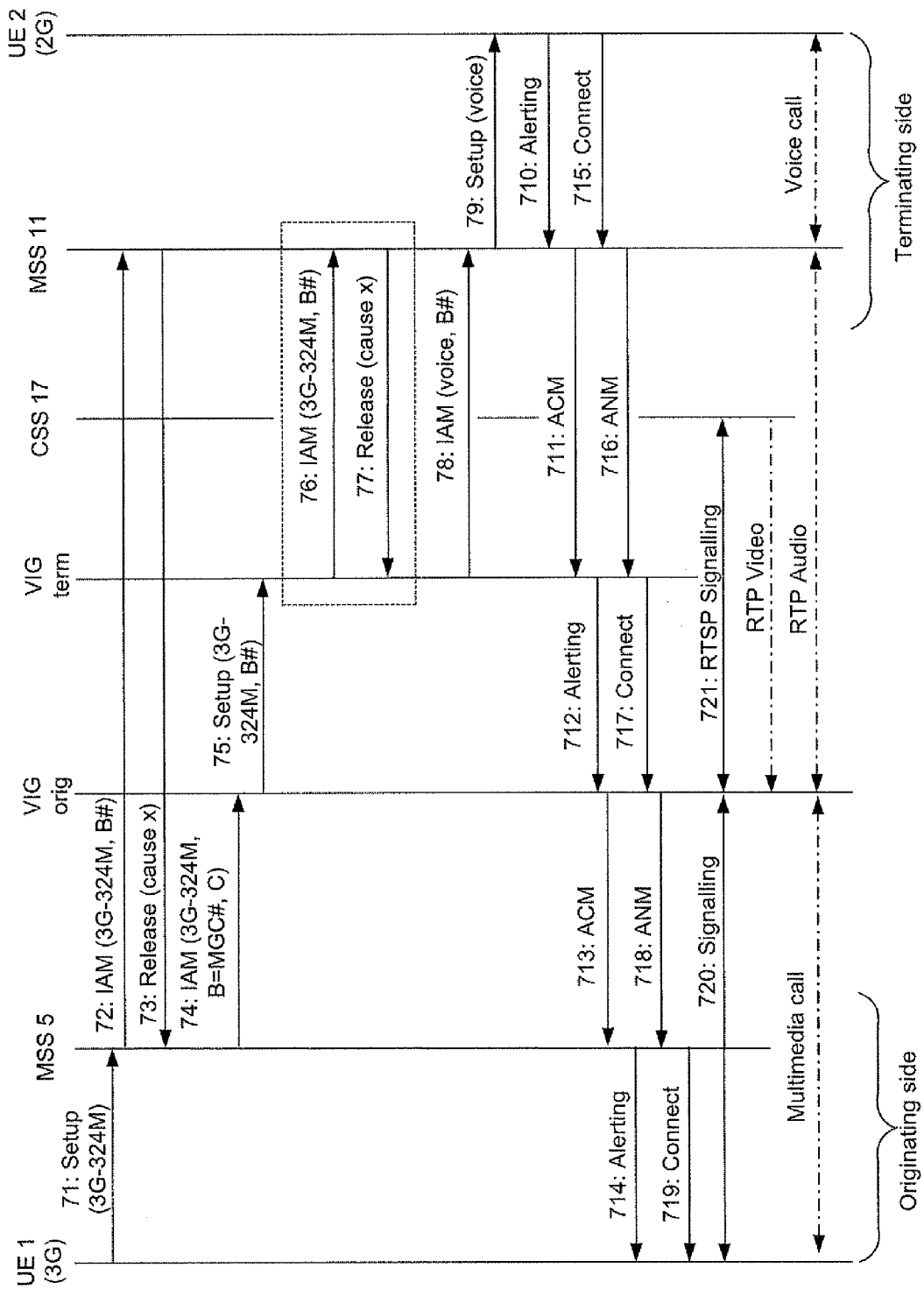
FIG. 7 shows another an exemplary operation of a video gateway according to an embodiment of the present invention.
Figure 8:
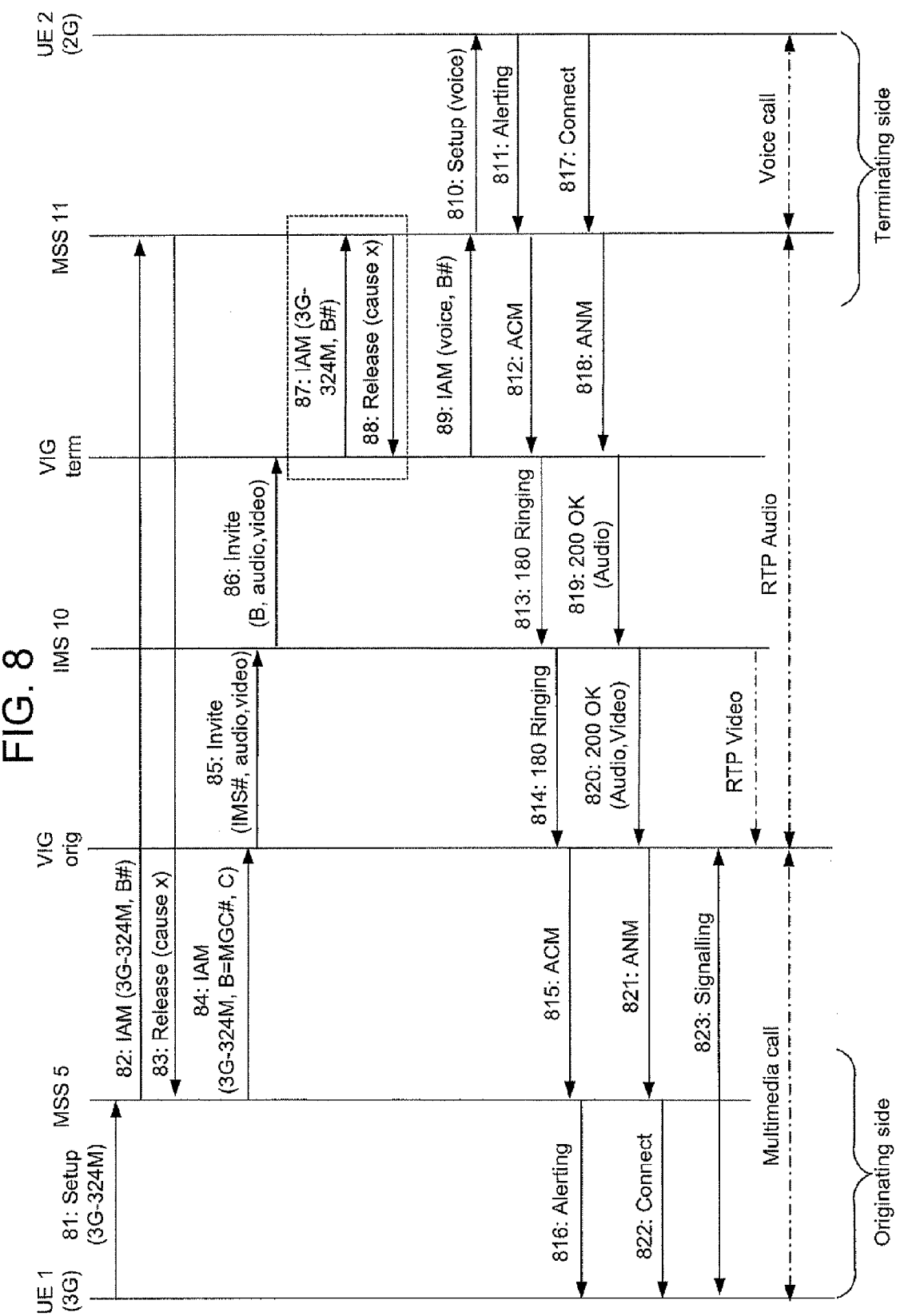
FIG. 8 shows another further signalling diagram describing an exemplary operation of a video gateway according to an embodiment of the present invention.

However, according to the following embodiments in FIG. 6-8, the present invention may be extended to also establish a video channel of the multimedia connection between the VIG$_{orig}$ in the VIG 9 and the user equipment UE1 in order to provide the user of the user equipment UE1 with additional mobile services. A video channel of the multimedia connection may, for example, be used by an operator to transmit desired video content, video streams, images, user specific photos or animations, commercials etc., to the user equipment UE1 during time the multimedia connection is active. This may further increase the user's willingness to use the multimedia service features of the user equipment UE1. Also, since the multimedia connection may be routed through the IMS domain or be connected to a content streaming server by the VIG 9, as will be seen below, it will therefore also be easier for an operator to invoke attractive and flexible services and provide them to the users.

FIG. 6 shows another exemplary operation of a video gateway according to an embodiment of the present invention. This exemplary operation refers to the same situation as previously mentioned in reference to FIGS. 2 and 3, the user equipment UE1 attempts a multimedia call to the user equipment UE2. The MSS 11 responds by releasing the multimedia call. According to the present invention and also described in more detail in relation to FIGS. 9 and 10, the MSS 5 may route the multimedia call request to the VIG 9.

In step 61, a multimedia call request relating to the multimedia call is received in the VIG 9 from the MSS 5.

In step 62, the VIG 9 performs a fall-back-to-voice, that is, sends a voice call request in order to set up a voice connection between the VIG 9 and the user equipment UE2 on the terminating side of the mobile radio communications system 1B.

In step 63, the VIG 9 sets up a multimedia connection between the VIG 9 and the user equipment UE1 on the originating side of the mobile radio communications system 1B. The VIG 9 may perform the set up by, for example, performing media negotiating signalling using the H.245 protocol with the user equipment UE1.

In step S64, the VIG 9 forwards audio over the multimedia connection to the user equipment UE1 on the originating side of the mobile radio communications system 1B, as well as, forwards audio over the voice connection to the user equipment UE2 on the terminating side of the mobile radio communications system 1B.

In step S65, the VIG 9 transmits data content from an IMS core network 10 or a content streaming server 17 to a logical channel for video in the multimedia connection to the user equipment UE1.

The exemplary operation of the VIG 9 described above, will beside the advantages mentioned in relation to FIG. 3, also enable for additional multimedia services to be transmitted or streamed to the user by using the logical channel for video in the multimedia connection to the user equipment UE1.

FIG. 7 shows another signalling diagram according to an exemplary embodiment of the present invention. In particular, it shows another signalling diagram describing in more detail an embodiment of the present invention for setting up a communication between the user equipment UE1 and the user equipment UE2 in the mobile radio communications system 1B.

The signalling 71-719 correspond to the signalling 41-419 described in reference to FIG. 4. However, before the $VIG_{orig}$ establishes communication over the multimedia connection to the user equipment UE1 and the voice connection of the $VIG_{orig}$ to the user equipment UE2 over the $VIG_{term}$, the $VIG_{orig}$ performs signalling 720 with the user equipment UE1 to set up the multimedia connection. In addition to the signalling 420 according to FIG. 4, the signalling 720 may be performed in order to negotiate suitable media formats and open up both a logical channel for audio and a logical channel for video in the multimedia connection. The signalling may performed using the H.245 protocol.

However, in this embodiment of the present invention, the MGC 54 in the $VIG_{orig}$ also performs RTSP (Real Time Streaming Protocol) signalling 721 towards at least one content streaming server (CSS) 17. This is performed in order to set up video streams from the CSSs 17 to the MGW 55 in the $VIG_{orig}$. The RTSP signalling 721 further allows the MGC 54 in the $VIG_{orig}$ in the VIG 9 to remotely control the video content from the CSSs 17. The standard for RTSP signalling is described in RFC 2326. In addition to standard RTSP signalling, the remote control interface in the MGC 54 may be arranged to include the information mentioned below in the RTSP signalling. This additional information may be included in the headers of the RTSP signalling messages.

For example, the B-number of the user equipment UE1 may be included by the MGC 54 in Describe and Setup requests towards the CSS 17. This may, for example, be performed for accounting or charging reasons. Another example is DTMF (Dual-tone Multi-Frequency) pressings by the user of the user equipment UE1 which may be included by the MGC 54 in a Set_Parameter request towards the CSSs 17. This may, for example, be performed in order to control the CSSs 17 to stop the current media stream and to start a new media stream in accordance with the DTMF pressings of a user. In the RTSP signalling, the CSSs may also be arranged to upon receiving said DTMF pressing from the MGC 54 in a Set_Parameter request respond by including a new RTP address and port of a new media stream in an Announce message. Thereby, video data content may be streamed from the CSSs 17 to the MGW 55 using RTP under the control of RTSP.

The MGC 54 then controls the MGW 55 to receive the video data content from the CSSs 17. The MGW 55 may forward the received video data content out onto the logical channel for video in the multimedia connection between the $VIG_{orig}$ and the user equipment UE1.

FIG. 8 shows another signalling diagram according to an exemplary embodiment of the present invention. In particular, it shows another signalling diagram describing in more detail an embodiment of the present invention for setting up a communication between the user equipment UE1 and the user equipment UE2 in the mobile radio communications system 1B. The signalling 81-84 correspond to the signalling 41-44 described in reference to FIG. 4.

However, in FIG. 8, the $VIG_{orig}$ in the VIG 9 may, as it receives the 3G-324M IAM message 84, send an SIP invite message 85 to the IMS core network 10 in order to invite the IMS core network 10 to supply data content for the multimedia connection between the $VIG_{orig}$ and the user equipment UE1, should such a multimedia connection be established. The IMS core network 10 may receive the SIP invite message 85 in, for example, an IMS application server. The IMS core network 10 may then include in the SIP invite message 86 include descriptor parts, such as descriptors for audio and video formats, and send the SIP invite message 86 to the $VIG_{term}$ in the VIG 9. The SDP, Session Description Protocol, of the SIP message invite 86 may include both audio and video descriptors, if they where offered in the SIP invite message 85.

The signalling 87-812 correspond to the signalling 46-411 described in reference to FIG. 4. Although now, as the $VIG_{term}$ receives the ACM message 812, it will map the ACM message 812 into a SIP 180 ringing message 813 and send it to the IMS core network 10. The IMS core network 10 responds by returning a SIP 180 ringing message 814 to the $VIG_{orig}$. The $VIG_{orig}$ maps the SIP 180 ringing message 814 into an ACM message 815 and forwards it to the MSS 5 that will alert 816 the user equipment UE1. The signalling 817-818 correspond to the signalling 415-416 described in reference to FIG. 4.

As the $VIG_{term}$ receives the ANM message 818, the $VIG_{term}$ will map the ANM message 818 into a SIP 200 OK message 819 and send it to the IMS core network 10. Since a fall-back-to-voice was made, the $VIG_{term}$ will only include an active audio descriptor, that is, the audio descriptor received from the user equipment UE2. By analysing the SIP 200 OK message 819, the IMS core network 10 may find out that only a voice connection is to be set up between the $VIG_{orig}$ and the user equipment UE2 over the $VIG_{term}$. The IMS core network 10 then sends a SIP 200 OK message 820 to the $VIG_{orig}$. The IMS core network 10 may in the SDP of the SIP 200 OK message 820 include the active audio descriptor received from the user equipment UE2, but also a video descriptor belonging to the IMS core network 10. The IMS core network 10 is now ready to begin to transmit or stream data content to the $VIG_{orig}$, which will forward the data content onto the video channel of a multimedia connection towards the user equipment UE1. The IMS core network 10 may also indicate, via the SDP of the SIP 200 OK message 820, to the $VIG_{orig}$ that the IMS core network 10 only wants to send video to the user equipment UE1, but not receive any video information. The signalling 821-822 will allow for signalling 823 for setting up the multimedia connection between the $VIG_{orig}$ in the VIG 9 and the user equipment UE1.

In order for the $VIG_{orig}$ to set up a multimedia connection between the user equipment UE1 and the $VIG_{orig}$ that allows interconnect with the voice connection between the $VIG_{orig}$ and the user equipment UE2, over the $VIG_{term}$, the $VIG_{orig}$ performs signalling 823 with the user equipment UE1. Similar to the signalling 420 and 620 according to FIGS. 4 and 6, respectively, the signalling 823 may be media negotiation signalling. The media negotiation signalling may be performed in order to negotiate suitable media formats and open up both a logical channel for audio and a logical channel for video in the multimedia connection. The signalling may performed using the H.245 protocol.

The $VIG_{orig}$ de-multiplexes the incoming signal of the multimedia connection. The $VIG_{orig}$ may then transmit audio from the user equipment UE2 over the logical channel for audio of the multimedia connection to the user equipment UE1, as well as, transmit audio from the use equipment UE1 over the voice connection, over the $VIG_{term}$, to the user equipment UE2. Additionally, the $VIG_{orig}$ in the VIG 9 may receive video data content from the IMS core network 10, and transmit or stream said video data content over the logical channel for video in the multimedia connection to the user equipment UE1.

As a result of the signalling described above, an audio communication is established between the user equipment UE1 on the originating side and the user equipment UE2 on the terminating side. The multimedia connection may, for example, be a 64 kbit/s unrestricted digital connection using the multiplex protocol H.223. Further, the multimedia connection may now also be connected to an RTP video stream, which may be provided by the IMS core network 10. The voice connection from the $VIG_{orig}$ to the MSS 11 may, as described in reference to FIG. 4, use an RTP audio stream. Furthermore, the voice connection between the MSS 11 and the user equipment UE2 may, as described in reference to FIG. 4, be performed using a standard 2G TDM (Time Division Multiplexing) connection.

FIG. 9 shows an exemplary operation of a mobile soft switch solution 5, 11 according to an embodiment of the present invention. In the exemplary situation as previously described above, the user of the user equipment UE1 associated with the MSS 5 on the originating side of the mobile radio communications system 1B will attempt a multimedia call to the user of the user equipment UE2 associated with the MSS 11 on the terminating side of the mobile radio communications system 1B. The user equipment UE1 will therefore send a multimedia call setup to the MSS 5.

The MSS 5 will receive the multimedia call setup. In response to the received multimedia call setup, the MSS 5 will send, through the circuit-switched network 8, a multimedia call request to the MSS 11 to which the user equipment UE2 is associated. The MSS 11 will receive the multimedia call request. The MSS 11 will discover that the user equipment UE2 is not located within a 3G coverage area 2, 15 or that the user equipment UE2 is not able to receive a multimedia call. Therefore, the MSS 11 will send back a release message to the MSS 5. The reason for the release may be indicated in the release message.

In step S91, the MSS 5 will detect a release of the multimedia call. The MSS 5 may detect the release of the multimedia call by receiving a release message from another MSS, which in this case is the MSS 11. However, should the user equipment UE2, for example, be located within its own geographical service area, the MSS 5 will be able to detect the release from within its own network.

In step S92, the MSS 5 will, in response to detecting of the multimedia call in step S91, send a multimedia call request to the VIG 9 in FIG. 2.

FIG. 10 shows another exemplary operation of a mobile soft switch solution 5, 11 according to an embodiment of the present invention. Here, the exemplary situation corresponds to the situation described above in reference to FIG. 9.

Step S101 corresponds to the step S91 as described in reference to FIG. 9.

In step S102, however, the MSS 5 analyses the reasons for the release of the multimedia call. For example, this may be performed by observing if a flag has been set in the release message or a specific cause code x indicating the reason for the release received from the MSS 11.

In step S103, the MSS 5 includes information about the reason for the multimedia call release in the 3G-324M IAM message to the VIG 9. For example, this may be performed by setting a flag in the 3G-324M IAM message indicating the reason for the multimedia call release.

In step S104, the MSS 5 sends the 3G-324M IAM message to the VIG 9.

If information about the multimedia call release is included in the 3G-324M IAM message 44, 64 and 84 in FIGS. 4, 6 and 8, respectively, then the signalling 46-47 in the signalling diagram shown in FIG. 4, the signalling 66-67 in the signalling diagram shown in FIG. 6, and the signalling 87-88 in the signalling diagram shown in FIG. 8 may be omitted by the VIG 9. In FIGS. 4, 6 and 8, this signalling is indicated inside the dashed lines. In reference to FIG. 5, it may also be noted that alternatively, the $VIG_{term}$ in the VIG 9 may be arranged to directly detect the status of the user equipment UE2 based on information about the reason for the multimedia call release according to this exemplary operation. The $VIG_{term}$ in the VIG 9 may also be arranged to directly detect the status of the user equipment UE2 based on information stored in a subscriber database.

In all of the embodiments of the present invention described, the VIG 9 may further include functionalities arranged to handle problems that may occur due to interoperability between the 3G user equipment UE1, that is, 3G-324M terminals, and the VIG 9. The following describes actions that may be performed in the signalling 420 in reference to FIG. 4, the signalling 720 in reference to FIG. 7, and the signalling 823 in reference to FIG. 8.

The solution presented by the embodiments above may be in such a way that the 3G-324M multimedia call between the 3G user equipment UE1 and the $VIG_{orig}$ in the VIG 9, contains no logical channel for video. This means, for example, in the H.245 media negotiation signalling, that the user equipment UE1 is prevented from opening the video channel. Since the 3G-324M implementation in the user equipment UE1 often is very restrictive, the user equipment UE1 may release the multimedia call if the video channel is not included. This restriction may be implemented in the user equipment UE1 in order to not consume expensive air-interface resources when a video channel is not possible between user equipments.

However, this does not prevent the $VIG_{orig}$ in the VIG 9 to, for example, in the H.245 media negotiation signalling, set up the video channel to the user equipment UE1 based on the 3G-324M terminal capabilities described by the UE1. This may be performed by, for example, identifying the type of the user equipment UE1 and its known capabilities based on a received H.245 vendor indication message received in the H.245 media negotiation signalling.

So, by identifying the restrictions of the user equipment UE1, the $VIG_{orig}$ may, for example, perform the signalling required by the user equipment UE1 in order to prevent the user equipment UE1 to release the multimedia call. This could, for example, be expressing video capabilities for the user equipment UE1 in the H.245 terminalCapabilitySet (TCS) sent from the VIG 9, or acknowledging in the VIG 9 the video H.245 openLogicalChannel (OLC) with an OLCack or OLCrej. Further examples in H.245 media negotiation signalling are: accepting but ignoring the video stream from the user equipment UE1 (if OLCack was sent by VIG 9), opening the video channel to the UE1 with OLC even though there is no video stream to send, and/or feeding a video stream on the channel (if OLCack was sent by the VIG 9). These actions may overcome the interoperability problems that may occur between the user equipment UE1 and the $VIG_{orig}$ in the VIG 9 and enable a more flexible interworking to the user equipment UE1 using 3G-324M.

The description above is has been made in terms of a video gateway 9, but it should also be noted that other intermediate nodes can be used in order implement the present invention. The description is not intended to be taken in a limiting sense, but is made merely for the purpose of describing the general principles of the invention. The scope of the present invention should only be ascertained with reference to the issued claims.

The invention claimed is:

1. A method for setting up communication between a first and a second user equipment in a mobile radio communications system, wherein said first user equipment is attempting a multimedia call to said second user equipment, comprising the steps of:
   receiving a multimedia call request in a video gateway relating to said multimedia call;
   sending a voice call request from said video gateway towards said second user equipment in order to set up a voice connection between the video gateway and said second user equipment;
   responding to the multimedia call request in order to set up a multimedia connection between the video gateway and said first user equipment;
   forwarding audio, received over said multimedia connection, onto said voice connection and forwarding audio, received over said voice connection, onto said multimedia connection;
   sending an invite message from said video gateway to an IMS core network inviting the IMS core network to supply data content for the multimedia call between the video gateway and the first user equipment; and
   establishing the video channel of said multimedia connection between the video gateway and the first user equipment in order to provide additional mobile services over said multimedia connection to said first user equipment.

2. The method according to claim 1, wherein said multimedia call request comprises information about a multimedia call release, and said method further comprising:
   identifying, by use of said information, that a multimedia call has been released; and wherein
   the step of sending a voice call request is performed in response to said identification.

3. The method according to claim 1, wherein the method further comprises the steps of:
   sending, if said multimedia call request does not comprise information about a multimedia call release, a multimedia call request from said video gateway towards said second user equipment upon receiving the multimedia call request in said video gateway; and wherein
   the step of sending a voice call request is performed in response to receiving a release message of the multimedia call in response to the multimedia call request.

4. The method according to claim 1, wherein the step of setting up a multimedia connection further comprises the steps of:
   the video gateway negotiating with the first user equipment a first media format to be used for audio transmission over the multimedia connection; and
   applying said negotiated first media format when forwarding audio to the first user equipment over the multimedia connection.

5. The method according to claim 1, further comprising the step of:
   the video gateway negotiating with the first user equipment a second media format to be used for video transmission over the multimedia connection;
   the video gateway performing signalling with at least one content streaming server in order to achieve the transmitting of data content from said at least one content streaming server to said video gateway;
   receiving data content from said at least one content streaming server; and
   transmitting data content from said at least one content streaming server over the multimedia connection, applying the negotiated second media format, to said first user equipment.

6. The method according to claim further comprising the steps of:
   sending a first message from said video gateway to said IMS core network, said message indicating to said IMS core network that the connection between the video gateway and the second user equipment does not carry video; and
   receiving a second message in said video gateway from said IMS core network comprising information enabling the video gateway to receive data content from said IMS core network.

7. The method according to claim 1, further comprising the steps of:
   the video gateway negotiating with the first user equipment a second media format to be used for video over the multimedia connection;
   receiving data content from said IMS core network; and
   transmitting said data content received from said IMS core network over the multimedia connection, applying the negotiated second media format, to said first user equipment.

8. A video gateway for use in a mobile radio communications system, wherein a first user equipment is attempting a multimedia call to a second user equipment, the video gateway being arranged to:
   receive a multimedia call request relating to said multimedia call,
   send a voice call request in order to set up a voice connection to the second user equipment,
   respond to the multimedia call request in order to set up a multimedia connection to the first user equipment, and
   forward audio, received over said multimedia connection, onto said voice connection and forward audio, received over said voice connection, onto said multimedia connection;
   send an invite message from said video gateway to an IMS core network inviting the IMS core network to supply data content for the multimedia call between the video gateway and the first user equipment; and
   establish the video channel of said multimedia connection in order to provide additional mobile services over said multimedia connection to said first user equipment.

9. The video gateway according to claim 8, further arranged to:
   identify that a multimedia call has been released by using information comprised in the multimedia call request; and
   send the voice call request in response to said identification.

10. The video gateway according to claim 8, further arranged to:
- send, if said multimedia call request does not comprise information about a multimedia call release, a multimedia call request from said video gateway towards said second user equipment upon receiving the multimedia call request in said video gateway; and
- send the voice call request in response to receiving a release message of the multimedia call associated with the multimedia call request.

11. The video gateway according to claim 8, further arranged to:
- negotiate with the first user equipment a first media form a to be used for audio transmission over the multimedia connection; and
- apply said negotiated first media format when forwarding audio to the first user equipment over the multimedia connection.

12. The video gateway according to claim 8, further arranged to:
- negotiate with the first user equipment a second media format to be used for video transmission over the multimedia connection;
- perform signalling with at least one content streaming server in order to achieve streaming of data content from said at least one content streaming server to said video gateway; and
- transmit data content from said at least one content streaming server over the multimedia connection applying the negotiated second media format to said first user equipment.

13. The video gateway according to claim 8, further arranged to:
- send a first message to said IMS core network, said message indicating to said IMS core network that the connection between the video gateway and the second user equipment does not carry video; and
- receive a second message from said IMS core network comprising information enabling the video gateway to receive data content from said IMS core network.

14. The video gateway according to claim 8, further arranged to:
- negotiate with the first user equipment a secondmedia format to be used for video over the multimedia connection, and
- transmit said data content received from said IMS core network over the multimedia connection, applying the negotiated second media format, between the video gateway and the first user equipment.

15. The video gateway according to claim 9, further comprising
- at least one media gateway,
- an originating media gateway controller arranged to set up and control the multimedia connection between the video gateway and the first user equipment, and
- a terminating media gateway controller arranged to set up and control the voice connection between the video gateway and the first user equipment,
- wherein said originating media gateway controller and said terminating media gateway controller are arranged to communicate with each other, an IMS core network and/or at least one content streaming server.

16. A computer program product for use in a video gateway, which comprises a non-transitory computer readable storage medium comprising computer-readable instructions, which when executed on the video gateway causes said video gateway to perform the steps of:
- receiving a multimedia call request in said video gateway relating to said multimedia call;
- sending a voice call request from said video gateway towards said second user equipment in order to set up a voice connection between the video gateway and said second user equipment;
- setting up a multimedia connection between said video gateway and said first user equipment; and
- forwarding audio, received over said multimedia connection, onto said voice connection and forwarding audio, received over said voice connection, onto said multimedia connection; and
- sending an invite message from said video gateway to an IMS core network inviting the IMS core network to supply data content for the multimedia call between the video gateway and the first user equipment; and
- establishing the video channel of said multimedia connection in order to provide additional mobile services over said multimedia connection to said first user equipment.

* * * * *

UNITED STATES PATENT AND TRADEMARK OFFICE
CERTIFICATE OF CORRECTION

PATENT NO. : 8,582,726 B2
APPLICATION NO. : 12/808927
DATED : November 12, 2013
INVENTOR(S) : Laiho et al.

Page 1 of 1

It is certified that error appears in the above-identified patent and that said Letters Patent is hereby corrected as shown below:

On the Title Page, Item (52), under "U.S. Cl.", in Column 1, Line 1, delete "455/414.3;" and insert -- 455/414.1; --, therefor.

In the Specification

In Column 5, Line 35, delete "3G coverage area 14" and insert -- 3G coverage area 15 --, therefor.

In Column 8, Line 1, delete "$VIG_{term}$," and insert -- $VIG_{term}$ --, therefor.

In Column 8, Line 66, delete "$VIG_{term}$," and insert -- $VIG_{term}$ --, therefor.

In Column 9, Line 5, delete "$VIG_{term}$," and insert -- $VIG_{term}$ --, therefor.

In Column 9, Line 14, delete "$VIG_{term}$," and insert -- $VIG_{term}$ --, therefor.

In Column 10, Line 17, delete "$VIG_{term}$," and insert -- $VIG_{term}$ --, therefor.

In Column 12, Line 24, delete "where" and insert -- were --, therefor.

In Column 12, Line 28, delete "$VIG_{term}$," and insert -- $VIG_{term}$ --, therefor.

In the Claims

In Column 16, Line 17, in Claim 6, delete "claim" and insert -- claim 1, --, therefor.

In Column 17, Line 13, in Claim 11, delete "form a" and insert -- format --, therefor.

In Column 17, Line 43, in Claim 14, delete "secondmedia" and insert -- second media --, therefor.

Signed and Sealed this
Sixth Day of May, 2014

Michelle K. Lee
*Deputy Director of the United States Patent and Trademark Office*